SEPARATION APPARATUS
Original Filed Nov. 13, 1962 3 Sheets-Sheet 1
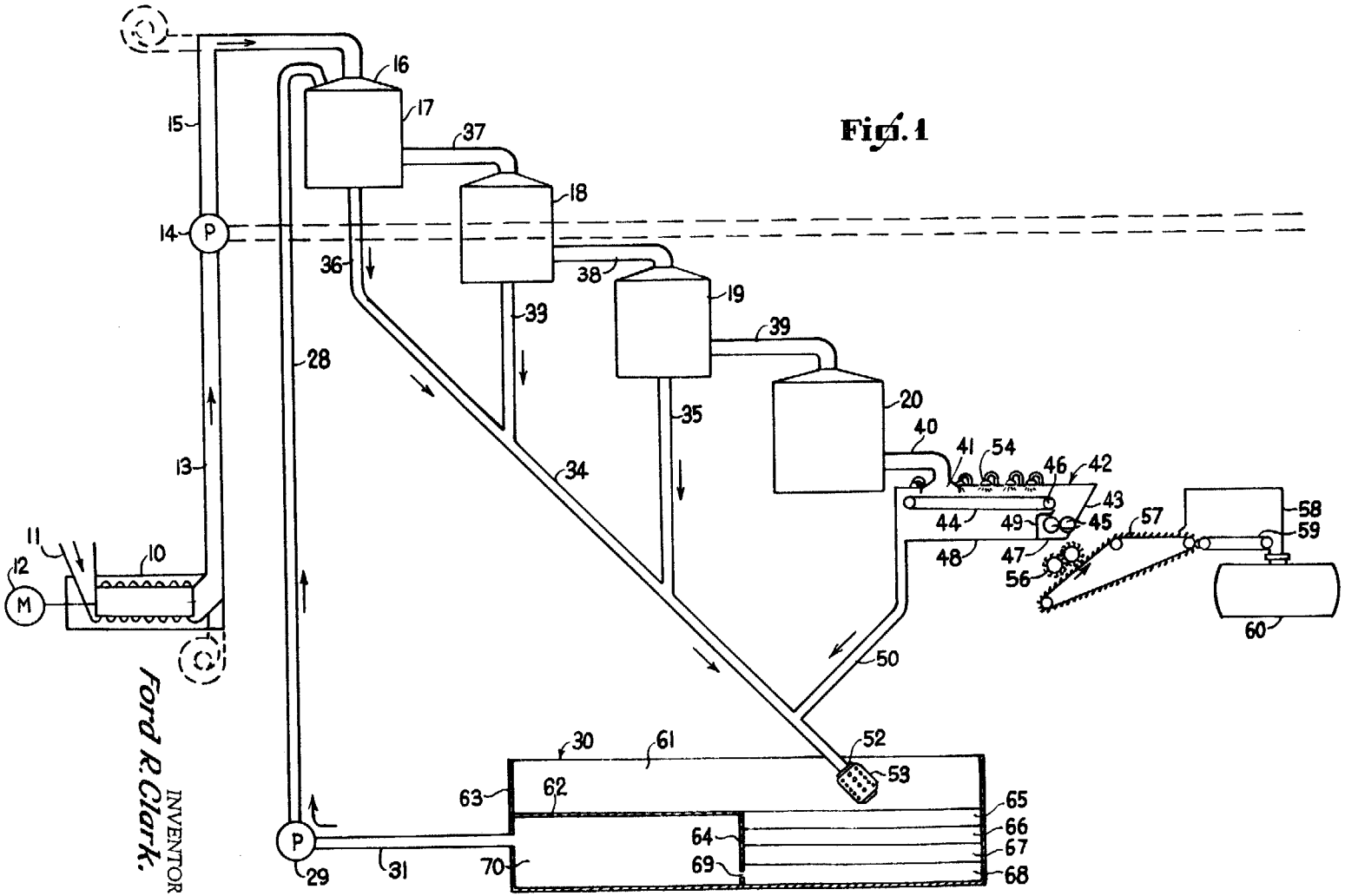

SEPARATION APPARATUS

Original Filed Nov. 13, 1962 3 Sheets-Sheet 2

INVENTOR
*Ford R. Clark.*

SEPARATION APPARATUS

Original Filed Nov. 13, 1962 3 Sheets-Sheet 3

INVENTOR
Ford R. Clark.

United States Patent Office

Re. 26,727
Reissued Dec. 2, 1969

26,727
SEPARATION APPARATUS

Ford R. Clark, 547 S. Crest Road,
Chattanooga, Tenn. 37411

Original No. 3,210,018, dated Oct. 5, 1965, Ser. No. 236,870, Nov. 13, 1962. Application for reissue Oct. 21, 1966, Ser. No. 595,551
Int. Cl. B02b *5/02;* B02c *9/04*
U.S. Cl. 241—101 7 Claims

Matter enclosed in heavy brackets [ ] appears in the original patent but forms no part of this reissue specification; matter printed in italics indicates the additions made by reissue.

*ABSTRACT OF THE DISCLOSURE*

*Apparatus and method for separating fibrous material, such as cotton linters, and pulp wood. The apparatus includes a series of tanks in which agitators mechanically separate the fibrous material, a spray ring for flushing the fibers with liquid and a drain at the bottom of each tank for conducting the water from the tank to a filter pit. The water in the pit is filtered and then recirculated through the system. The cotton fibers pass from the tanks into a catch basin where they are deposited on a moving screen mesh belt and subjected to additional water sprays. From the endless belt, the cotton fibers pass between press rollers and are deposited on a pair of picker drums and then deposited on an inclined conveyor or belt which carries the fibers into a dryer. After being dried, the fibers are stored in a digester.*

This invention relates to industrial chemistry and more particularly to apparatus used to separate certain organic matter for practical use in manufacturing.

Although industrial chemistry in various forms is one of the oldest arts in existence, it has only been rather recently, that is, within the last hundred years, that this art has begun to be recognized and appreciated by the average man. This is largely due to the fact that industrial chemistry, as its name implies, has to do with industry which has, of course, been on a continuous upswing since the advent of mass production of consumer goods.

It has long been recognized by those experienced in industrial chemistry that the present day method of decorticating fibrous materials, as well as breaking up and/or otherwise disintegrating various materials, is a long and laborious process requiring considerable manpower and machinery. The few attempts that have been made to improve machinery for this purpose have met with utter failure, either because they were so complicated as to be a continuous source of trouble or else the machinery has been so simple as to fail in its original objective of separating the material at hand.

It is therefore an object of this invention to provide a separation apparatus that will completely separate any fibrous material such as cotton, linters, pulpwood and the like in a minimum of time and with a minimum of effort.

Another objective of this invention is to provide separation apparatus that has a minimum number of moving parts and is therefore apparatus that has a minimum number of breakdowns.

Another object of this invention is to provide a separation apparatus that takes up a minimum amount of room.

Another object of this invention is to provide separation apparatus embodying a plurality of tanks whose contents perform a separate one of the separation steps.

Another object of this invention is to provide separation apparatus having a mechanical breaker in which the material is first fed for disintegration before it is transported to the plurality of dropping tanks thereby lessening the possibility of the feed lines to the tanks becoming jammed.

Another object of this invention is to provide separation apparatus having one major drain line which is connected to each one of the drop tanks by a separate drain line, thereby increasing the efficiency of the apparatus.

Another object of this invention is to provide separation apparatus that can be enclosed within a single frame if so desired.

Another object of this invention is to provide a separation apparatus that requires only one man for its operation.

Still another object of this invention is to provide separation apparatus that can easily be cleaned with a minimum of effort.

Other and further objects and advantages of this separation apparatus will be hereinafter described, and the novel features thereof defined in the appended claims.

Referring to the drawing:

FIGURE 1 is a side view of the basic units of this invention shown in their appropriate position for use.

Similar reference characters refer to similar parts throughout the several views of the drawing.

Figure 3:
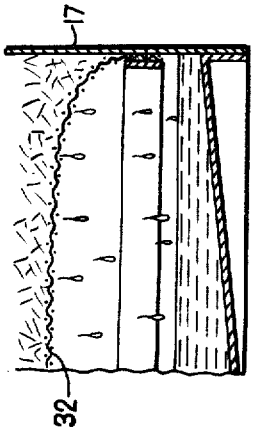
FIGURE 3 is an enlarged sectional view of that portion of this invention that is enclosed within the arrowed circle and the numeral 3 in FIGURE 2.

Having reference now to the drawing in detail, there is generally indicated by the character 10 a mechanical material breaker having a hopper 11 and an electric motor 12 and a pipe line 13 through which the material is pulled by suction created by the vacuum pump 14. The material breaker 10 which is operated by the aforesaid electric motor 12 can of course be of any desired construction. A material feed pipe 15 extends from the aforesaid vacuum pump 14 to the top 16 of what I personally call a "catch tank" 17 which is basically similar in construction to the drop tanks 18 and 19 and the settling tank 20, all of which are clearly shown in FIGURE 1 of the appended drawings where it is also seen that each one of the tanks contains a centrally located vertically mounted shaft 21 to which is secured in vertical spaced relation to each other a plurality of horizontally disposed arms 22 to the outer end of which is centrally attached vertically to a rectangular paddle 23. The agitator 24 which embodies all of the aforesaid parts that are characterized by the reference characters 21, 22, and 23, is rotated by an electric motor 25 or any other desired source of power that may be housed in the sealed container 26 that is mounted on the top of the aforesaid shaft 21. A circular spray ring 27 having a plurality of openings therein is located in the upper portion of the aforesaid catch tank 17. The spray ring is fed by means of a water pipe 28 that is connected to the outlet side of the water pump 29 which has its inlet side connected to filter pit 30 by means of the pipe 31. A fine wire mesh screen 32 is located in the bottom of each one of the aforesaid tanks 17, 18, 19 and 20. A drain pipe 33 has its upper end connected to the center of the drop tank, while the lower end is connected to the drain line 34. A drain pipe 35 likewise connects the drop tank 19 to the aforesaid drain line 34 which has its upper end 36 terminating in the bottom of the catch tank 17.

A discharge pipe 37 connects the lower portion of the aforesaid catch tank 17 with the top of the drop tank 18, while a like discharge pipe 38 connects the lower portion of the drop tank 18 with the top of the drop tank 19. A discharge pipe 39 connects the lower portion of the drop tank 19 with the top of the settling tank 20, while a discharge pipe 40 connects the lower portion of the settling tank 20 with the hood 41 of the catch basin 42.

Figure 4:
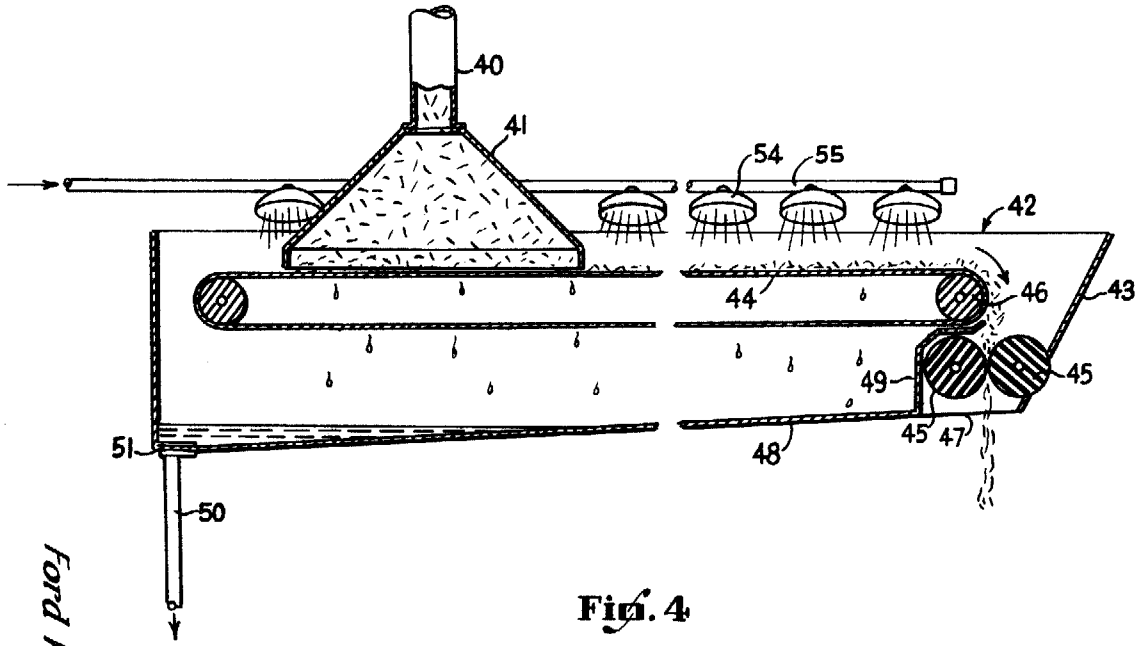
FIGURE 4 is an enlarged vertical sectional view of that portion of this invention known as the sprayers.

The catch basin 42 consists of a rectangular tank 43 having an endless screen mesh belt 44 horizontally mounted in the upper portion thereof and driven by any suitable means such as an electric motor (not shown in the appended drawings). A pair of material pressing rollers 45 is mounted in one end of the aforesaid rectangular tank 43 and positioned under pulley 46 in a way that will receive material from the aforesaid endless screen mesh belt 44 between the two aforesaid pressing rollers 45 as clearly shown in FIGURE 4 of the appended drawing. The material is discharged through the opening 47 in the bottom 48 of the tank 43. The tank is provided with a baffle plate 49 to prevent any liquids in the aforesaid tank 43 from running out of the already mentioned opening 47. A tank discharge pipe 50 connects the lowermost end 51 of the aforementioned tank 43 with the aforesaid drain pipe 34 which has its lowermost end 52 terminating in a cylindrical filter 53. A plurality of sprinkler heads 54 is horizontally located in equal parallel spaced relation to each other along the feed pipe 55, FIGURE 4.

A pair of pickers 56 in cylindrical form when viewed from either end is so located under the aforesaid opening 47 in bottom 48 of the rectangular tank 43 of the catch basin 42 as to receive material coming from the opening 47 between the two aforesaid pickers where the fibers of the compressed material are separated to spread more uniformly on belt 57. The pickers are driven cylinders each having a plurality of hooks as indicated in FIGURE 1 of the drawing. The material then enters the blower drier 58 and is transmitted onto the horizontally disposed endless belt 59 from which it is discharged into the digester 60 where the material is kept until its use is required in the manufacture of consumer goods.

It has already been stated that this invention embodies a filter pit 30 although its contents have not been described. The filter pit contains an upper compartment 61 that is rectangular in plan form and the aforesaid compartment has a horizontally disposed bottom plate 62 that extends approximately half way from one end 63 to the other end of the pit. That end of the aforesaid bottom plate 62 that is not secured to the end 63 is supported by the upper edge of a vertically disposed plate 64. The construction just described provides a compartment for the filter 65 under which is located the cells 66 and under the cells 66 is a layer of cells impregnated with filter material 67 which in turn is above a water compartment 68. Water from compartment [69] *68* flows through the opening 69 in the aforesaid end 64 on into the second and larger water compartment 70 from which the water flows on into the aforesaid pipe 31 which has one end secured to the aforesaid end 31 of the filter pit 30. The detailed arrangement of this aforesaid filter pit 30 as well as all other parts of this novel invention is subject to rearrangement as the detailed installation of this invention may require according to the size and shape of the space to be used for the same.

Figure 2:
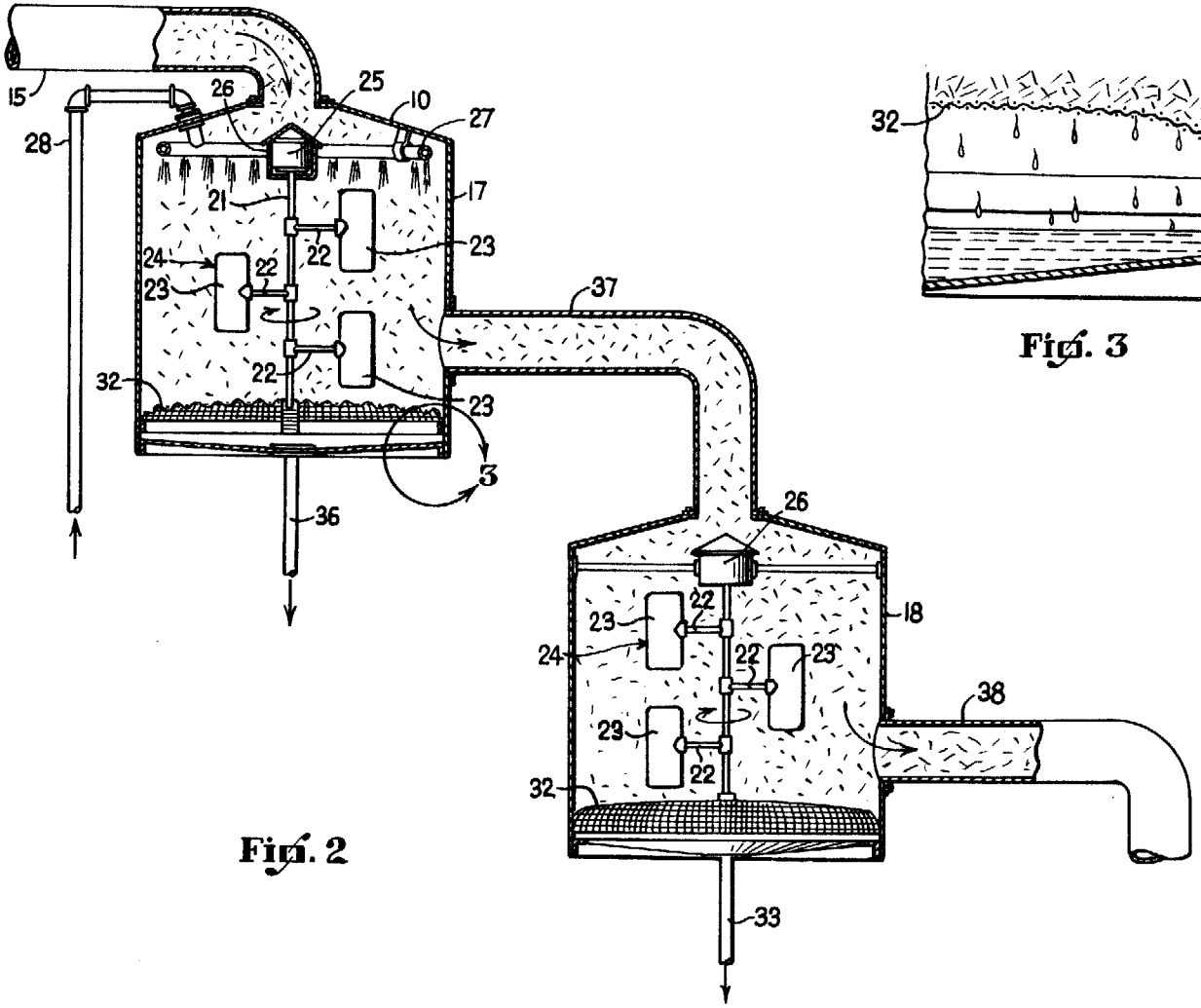
FIGURE 2 is an enlarged vertical sectional view of two of the tanks of this invention showing their internal mechanism.

The operation of this unusual and very efficient separation apparatus that I have invented is quite obvious from FIGURE 1 where it can be seen that any fibrous material such as cotton, linters, pulpwood and the like can be fed into the hopper 11 of the breaker 10 where it will be broken up or otherwise conditioned after which the material is transmitted by suction created by the aforesaid vacuum pump 14 up through the pipe line 13 and the materials feed pipe 15 on into the catch tank 17 where the material is thoroughly saturated with water entering the catch tank 17 through the water pipe 28 and circular spray ring 27. The saturated material is agitated by the agitating mechanism clearly shown in FIGURE 2 of the appended drawings. The small particles of the material are now separated from the water by means of a fine wire mesh screen 32 after which the water passes on down through the drain line 34 to and through the filter pit 30 of this interesting invention where it is filtered and pumped back to the aforesaid catch tank 17 where it is used over and over again.

The material being processed by this separation apparatus that I have invented is now forced through the discharge pipe 37 from the catch tank 17 on into the first one of two drop tanks by means of the agitator 24 in catch tank 17 where more of the water in the material is drained off as in the previously described catch tank 17. The process is repeated as the material is forced on into the drop tank 19 after which it passes on into the settling tank 20 through the discharge pipe 39. From the settling tank 20 the material is forced through the discharge pipe 40 to the rectangular catch basin 42 where it is further washed by water from the sprinkler heads 54 as the material is transported along on the endless screen mesh belt 44 to the pair of pressing rollers 45 through which the material passes as it is dropped onto the endless belt 57 after being separated by the pair of pickers 56. The material now enters the blower drier 58 from whence it is transported by an endless belt 59 to the digester 60 as clearly shown in FIGURE 1 of the appended drawing.

It should be understood that my invention is not limited strictly to the exact details of construction shown in which my invention is illustrated as applied to a particular form of existing separation apparatus construction, but my invention includes a reasonable range of equivalents of structures.

What I claim as new and desire to secure by Letters Patent is:

*1.* An apparatus for treating [raw treating] raw fibrous material comprising, a breaker in which fibrous material is broken into fibers, a tank having an input near the top, an output near the bottom and a strainer in the bottom, structure for transporting said fibers into said tank, a water filter having an input and an output, structure for transporting water from said output into said tank, an agitator within said tank for agitating said fibers and water, a pipe connected to said strainer and filter input to transport strained water and impurities from the strainer to the filter, means for transporting water and fibers from the output of the tank into a catch basin, structure for spraying said fibers in said catch basin, a pair of *compressor* rollers, structure for directing the output of the catch basin between said rollers to press the water out of the fibers, a pair of picker rollers positioned to receive the fibers from the compressor rollers, a dryer positioned to receive fibers from the picker rollers, a digester and structure for transporting fibers from the dryer to the digester.

*2. Apparatus for purifying cotton linters comprising means for injecting water into a mass of said cotton linters to form a slurry, means for agitating said slurry, means independent of said agitating means for separating said linters, means for conducting said linters from said agitating means to said separating means, and a conveyor having a support surface thereon, said surface being positioned to receive said linters from said separating means and being inclined.*

*3. The apparatus according to claim 2 wherein said separating means includes a pair of opposed pickers, said linters passing between said pickers.*

*4. The apparatus according to claim 2 wherein said agitating means includes a tank and a plurality of paddles mounted for rotation in said tank, means in said tank for filtering water from said slurry.*

*5. Apparatus for washing and subsequently drying fibrous material comprising: a conveyor having a material support surface, said conveyor being in the form of a screen, means for depositing said material on said conveyor adjacent one end of said surface, means for advancing said conveyor from said one end to the opposite end of the support surface, means for spraying wash*

*liquid on said material while on said surface, a pair of press rolls mounted in opposed relation adjacent said opposite end, whereby wash liquid drains from said material while on said conveyor and is pressed from said material as it passes said press rolls.*

*6. Apparatus according to claim 5 including a pair of opposed pickers adjacent said support surface opposite end, whereby said washed material passes between said pickers.*

*7. Apparatus according to claim 5 including means for collecting wash liquid below said conveyor, and means for filtering said collected wash liquid.*

References Cited

The following references, cited by the Examiner, are of record in the patented file of this patent or the original patent.

UNITED STATES PATENTS

| | | | |
|---|---|---|---|
| 654,647 | 7/1900 | Koppelmann | 241—28 |
| 1,803,766 | 5/1931 | O'Keeffe | 134—25 |
| 2,013,042 | 9/1935 | Foster | 241—39 |
| 2,162,778 | 6/1939 | Kent | 241—21 |
| 3,284,282 | 11/1966 | Immel | 241—15 |
| 668,211 | 2/1901 | Powter | 210—173 |
| 903,138 | 11/1908 | Jawell | 210—70 |
| 2,046,845 | 7/1936 | Raisch | 210—173 |
| 2,094,909 | 10/1937 | Bailey et al. | 210—173 |
| 2,745,712 | 5/1956 | Burling | 210—195 |
| 2,828,018 | 3/1958 | Cheyen | 210—195 X |
| 3,072,567 | 1/1963 | Evans et al. | 210—195 X |

GERALD A. DOST, Primary Examiner

U.S. Cl. X.R.

134—25; 210—195; 241—78